Feb. 25, 1936.  C. G. W. TALEN  2,032,030
BUILDING CONSTRUCTION
Filed Jan. 10, 1935
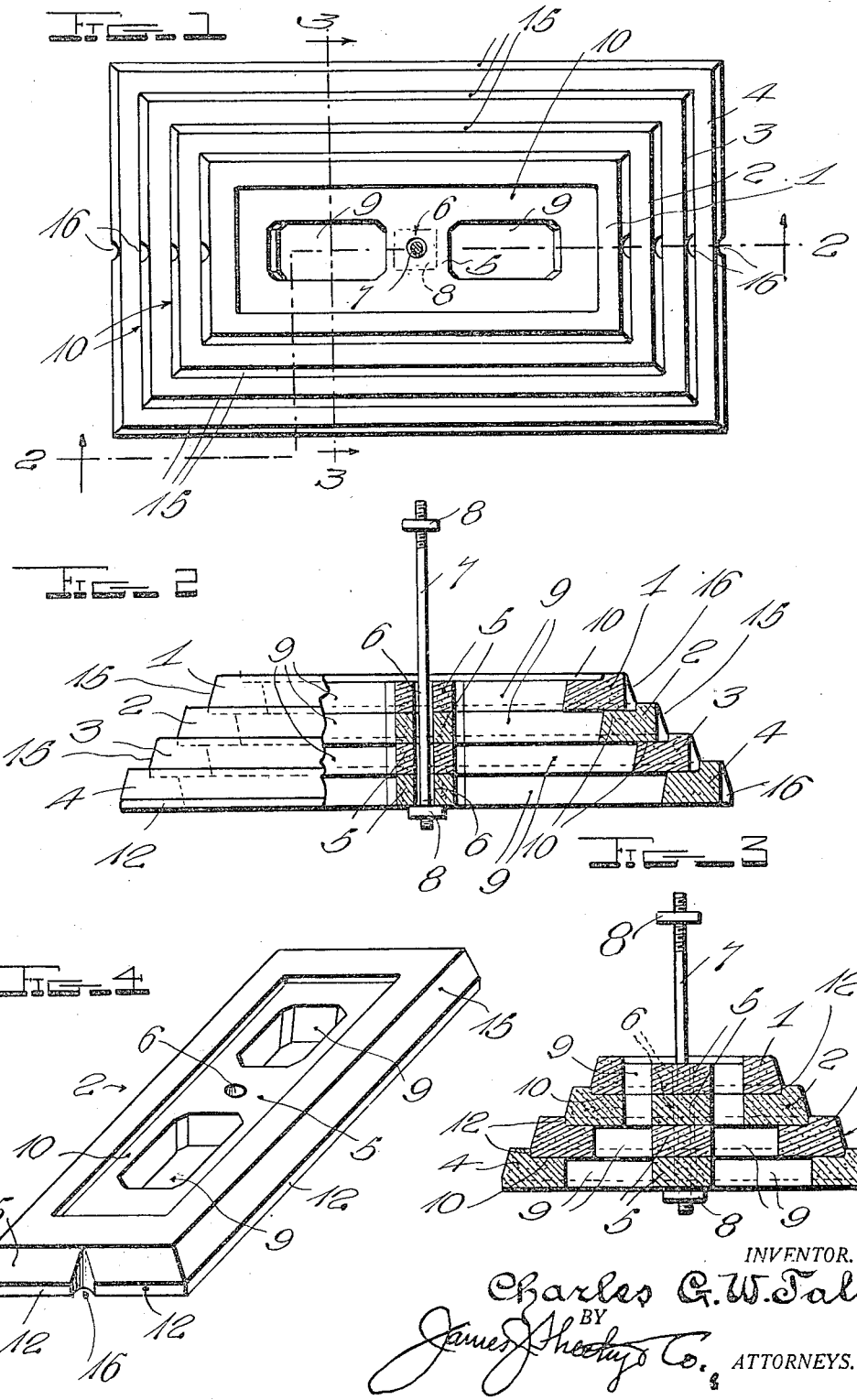
INVENTOR.
Charles G. W. Talen
BY
James Sheehy Co.
ATTORNEYS.

Patented Feb. 25, 1936

2,032,030

UNITED STATES PATENT OFFICE 2,032,030

BUILDING CONSTRUCTION

Charles G. W. Talen, New Orleans, La.

Application January 10, 1935, Serial No. 1,203

1 Claim. (Cl. 72—77)

My present invention pertains to piers, or other footing and it contemplates the provision of a simple and inexpensive series of building blocks that are interlocked to each and retained rigidly without the use of mortar, cement or other fastening elements than that shown.

Other objects of the invention will be fully understood from the following description and claims when the same are read in connection with the drawing accompanying and forming part of this specification, in which Figure 1 is a top plan view illustrating a series of blocks superimposed one above the other to form a footing or pier.

Figure 2 is a view taken in the plane indicated by the line 2—2 of Figure 1, and looking in the direction of the arrows.

Figure 3 is a sectional view taken in the plane indicated by the line 3—3 in Figure 1 and looking in the direction of the arrow.

Figure 4 is a detail perspective view illustrating one of a series of blocks that go to make up the footing.

Similar numerals of reference designate corresponding parts in all the views of the drawing.

My novel footing may comprise any number of blocks which are preferably formed of cement, hollow tile or the like but for the purpose of illustration, I have shown four blocks indicated by 1, 2, 3, and 4 respectively, and the blocks are provided with the member 5 that in turn has an aperture 6. The member 5 in reality is a bridge member.

Adapted to pass through the opening 6 is a rod 7 provided on each of its ends with a threaded nut 8. Manifestly when a series of blocks are superimposed upon each other they may be rigidly retained with respect to each other by turning the nuts 8 as illustrated. Adjacent the portion 5 of the blocks is an opening 9 into which dirt, cement or other material may be poured while at 10 I illustrate recesses in each of the blocks and it will be noted that the edges 12 of each block rest in the recess 10 of an abutting block when the blocks are superimposed one upon the other. The blocks further are beveled as indicated at 15 so as to form a wedge-like surface and at 16 notches are provided and these notches may be employed to receive rods so as to assist the rod 7 to more rigidly secure the blocks with respect to each other.

In the practical operation of the device, a wall or footing may be quickly constructed without the employment of skilled labor by merely placing one block above the other and securing said blocks to each other by means of the rod 7.

What I claim is:

A building construction comprising a series of hollow tile blocks, openings formed in the blocks and adapted to aline with the openings of an abutting block when the blocks are superimposed upon each other, recesses formed in the upper face of the blocks to provide a seat for an abutting block; said blocks being provided further with a central opening adapted to aline itself with the openings of abutting blocks, a rod adapted to pass through the central openings and nuts adapted to be threaded on the rods whereby displacement of the blocks with respect to each other is precluded.

CHARLES G. W. TALEN.